(12) United States Patent
Lickes et al.

(10) Patent No.: US 6,426,378 B1
(45) Date of Patent: *Jul. 30, 2002

(54) PARTIALLY VULCANIZED SHAPED RUBBER COMPOSITION AND PREPARATION OF AN ARTICLE, INCLUDING TIRES, HAVING A COMPONENT THEREOF

(75) Inventors: Jean-Paul Lickes, Luxembourg; Denis Jean René Gerard, Arlon; Marc Jules Alexis Henoumont, Habay-la-Neuve, all of (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/400,591

(22) Filed: Sep. 22, 1999

(51) Int. Cl.⁷ .................................................. C08K 5/24
(52) U.S. Cl. ....................................... 524/262; 524/444
(58) Field of Search ................................. 524/444, 262

(56) References Cited

U.S. PATENT DOCUMENTS 6,251,992 B1    6/2001    Sandstrom .................... 525/79

*Primary Examiner*—Peter D. Mulcahy
(74) *Attorney, Agent, or Firm*—Henry C. Young, Jr.

(57) ABSTRACT

The invention relates to the preparation of a partially vulcanized, pre-shaped rubber composition and use thereof as a component of an article of manufacture. In practice, the partially vulcanized rubber composition is adhered to an unvulcanized rubber substrate to form a composite thereof and the resulting composite vulcanized to create an article of manufacture. Such pre-vulcanized rubber composition is a composite comprised of at least one diene-based elastomer, amorphous silica, coupling agent and liquid diene-based polymer. Such partially vulcanized, pre-shaped rubber composition may be a component of a tire such as, for example, an apex, sidewall insert or tread. It may also be a component of an industrial rubber product such as, for example, a component of a conveyor belt, power transmission belt or a hose.

131 Claims, No Drawings

PARTIALLY VULCANIZED SHAPED RUBBER COMPOSITION AND PREPARATION OF AN ARTICLE, INCLUDING TIRES, HAVING A COMPONENT THEREOF

FIELD

The invention relates to the preparation of a partially vulcanized, pre-shaped rubber composition and use thereof as a component of an article of manufacture. In practice, the partially vulcanized rubber composition is adhered to an unvulcanized rubber substrate to form a composite thereof and the resulting composite vulcanized to create an article of manufacture. Such pre-vulcanized rubber composition is a composite comprised of at least one diene-based elastomer, amorphous silica, coupling agent and liquid diene-based polymer. Such partially vulcanized, pre-shaped rubber composition may be a component of a tire such as, for example, an apex, sidewall insert or tread. It may also be a component of an industrial rubber product such as, for example, a component of a conveyor belt, power transmission belt or a hose.

BACKGROUND

Various articles of manufacture are sometimes produced by forming an assembly of a plurality of components of unvulcanized rubber compositions and vulcanizing the resulting assembly, at an elevated pressure and temperature in a suitable mold to form a vulcanized rubber product.

Conventionally, the unvulcanized rubber composition tends to flow somewhat within the mold during the vulcanization process. While the mold may confine the overall volume of the assembly, various unvulcanized rubber components of assembly tend to flow somewhat and to, therefore, become somewhat distorted.

Accordingly, one or more components of an assembly may be partially pre-vulcanized, or pre-cured, in order to enhance their dimensional stability during the vulcanization process. For example, it has been proposed to pre-vulcanize a tire's apex prior to building it into an assembly of unvulcanized tire components and then vulcanizing the resulting in a suitable mold under conditions of elevated temperature and pressure to create a resulting vulcanized tire. It is believed that such suggested practice is well known to those having skill in such art.

Upon vulcanization of the assembly of components, good adhesion and co-adhesion between the various components at their individual interfaces is desired, and is usually required, for stability of the resulting product under working conditions. Such philosophy of adhesion between the individual vulcanized rubber components of manufactured articles is well known to those having skill in such art.

For example, as hereinbefore discussed, a rubber tire may be prepared by assembling various unvulcanized rubber-based components and building an assembly of such components, followed by sulfur vulcanizing the resulting assembly in a suitable mold at an elevated temperature to form the tire as an article of manufacture.

As a further example, rubber tires are sometimes re-treaded by applying a partially pre-cured rubber tread to an already cured rubber carcass, with an uncured adhesive rubber composition gum strip therebetween for enhanced adhesion purposes and the resulting assembly vulcanized to form the re-treaded tire.

Adhesion of the various vulcanized rubber-based components to each other is usually of significant importance for the above resulting tires as would be understood by those having skill in such art.

As hereinbefore discussed, for some applications it may be desired for an individual rubber-based component to have sufficient dimensional stability that it does not appreciably deform during the building, shaping and molding of an assembly of rubber-based components in the preparation of an article of manufacture.

Accordingly, for many of the above component assembly purposes, it is desired that a rubber-based component be partially pre-vulcanized and pre-shaped, prior to its assembly with other unvulcanized rubber components yet still exhibit good adhesion to each other at their interfaces upon vulcanization of the assembly to form an article of manufacture.

However, it is to be appreciated that such good vulcanized adhesion between rubber-based components may be significantly reduced where one rubber-based component has been partially pre-vulcanized prior to assembly with at least one unvulcanized rubber-based component and the resulting assembly then vulcanized.

It is hypothesized that such reduction of vulcanized adhesion may be due, for example, to a possible reduction in cross-linking between the interfaces of the associated components during the vulcanization of the assembly. Also, there may be a reduced mobility of various constituents of the partially pre-vulcanized component which may logically lead to reduced interfacial adhesion to other associated rubber-based components after vulcanization of the assembly unless an intermediate adhesive layer (cement layer) is applied to at least one interfacial surface prior to assembling the respective components in order to achieve adequate adhesion after vulcanization.

It is believed that occurrence of such phenomenon of reduced vulcanized adhesion between such components is well known to those having skill in such art.

In the description of this invention, the term "phr" means "parts by weight of a specified ingredient per 100 parts by weight of elastomer".

Also, in the description of this invention, the terms "rubber" and "elastomer" are used interchangeably, unless otherwise noted.

The terms "vulcanized" and "cured" are also used interchangeably unless otherwise noted.

SUMMARY OF PRACTICE OF THE INVENTION

In accordance with this invention, a partially sulfur pre-vulcanized rubber composition is provided which is comprised of, based on 100 parts by weight of elastomer, (A) at least one solid diene-based elastomer selected from homopolymers and copolymers of conjugated diene and copolymers of at least one conjugated diene with a vinyl aromatic compound selected from styrene and alpha-methylstyrene, (B) about 3 to about 15, alternatively about 3 to about 10, phr of liquid conjugated diene polymer having a molecular weight in a range of about 1,000 to about 40,000, alternatively about 4,000 to about 20,000, (C) from about 45 to about 65 phr of reinforcing filler selected from amorphous silica, aluminosilicate which is preferably an amorphous aluminosilicate, and modified carbon black; wherein said amorphous silica, aluminosilicate and modified carbon black have hydroxyl groups (e.g.: silanol groups) on the surface thereof and, wherein said reinforcing filler contains from about 60 to about 100, preferably about 80 to about 100, weight percent of at least one of said amorphous silica and aluminosilicate and (D) a coupling agent having a moiety reactive with said hydroxyl groups (e.g.: silanol groups) on the surface of the said amorphous silica, aluminosilicate and modified carbon black, as the case may be, and another moiety interactive with at least one of said diene-based elastomers; wherein said rubber composition is pre-sulfur vulcanized to about 20 to about 60 percent of its $T_{90}$ vulcanization state.

In further accordance with this invention, such rubber composition is pre-shaped and partially sulfur pre-vulcanized by positioning said rubber composition in a suitable enclosed mold cavity and heating the rubber composition to a temperature in a range of about 140° C. to about 190° C. for a sufficient period of time for the rubber composition to vulcanize to about 20 to about 60, preferably about 20 to about 50, percent of its $T_{90}$ vulcanization state according to ASTM D5289.

Representative of said liquid conjugated diene-based polymers are, for example, liquid cis 1,4-polyisoprene polymers, liquid cis 1,4-polybutadiene polymers and liquid styrene/butadiene copolymer polymers.

Preferably, said liquid polymer is a cis 1,4-polyisoprene polymer. Such polymer may be a depolymerized cis 1,4-polyisoprene elastomer.

Alternatively, said liquid conjugated diene-based polymers may be end functionalized with hydroxyl, mercapto and/or epoxy moieties and, thus, have an enhanced reactivity potential.

In practice, it is preferred that the resulting interfacial adhesion between said vulcanized components is at least 15 N/mm.

Such interfacial adhesion may be determined by an adhesion measuring apparatus by pulling one rubber composition away from another rubber composition at a right angle to each other with the two ends (one end of each rubber sample) being pulled apart by an Instron test machine at a cross-head speed of about 500 mm/minute at a temperature of about 100° C.

The area of contact between the test samples was defined by placement of a Mylar film between the test samples and curing the respective rubber compositions in this condition at an elevated temperature with a window in the Mylar film to allow the two test samples to adhere together.

Such method of measuring interfacial adhesion is well known to those having skill in such art.

In practice, it is preferred that the partially pre-vulcanized rubber composition, prior to its pre-vulcanization, contains free sulfur curative in a range of about 2 to about 8, preferably about 3 to about 6 phr in order for some free sulfur to remain at its surface after its partial pre-vulcanization to promote crosslink buildup, or formation, at the interface between the partially pre-vulcanized component and unvulcanized component(s) when the assembly thereof is vulcanized.

In one aspect of this invention, the rubber composition for the partially pre-vulcanized rubber composition may be pre-shaped and partially pre-vulcanized by compression molding in an enclosed mold cavity and vulcanizing the rubber composition therein to about 20 to about 60, alternatively about 20 to about 50, percent of its $T_{90}$ vulcanization state according to ASTM D5289.

In another aspect of this invention, the rubber composition for the partially pre-vulcanized rubber composition may be pre-shaped and partially pre-vulcanized by injection molding the unvulcanized rubber composition into an enclosed mold cavity and vulcanizing the injected rubber composition therein to about 20 to about 60, alternatively about 20 to about 50, percent of its $T_{90}$ vulcanization state according to ASTM D5289.

In further accordance with this invention said injection molding of the unvulcanized rubber composition is accomplished by extruding the unvulcanized rubber composition by a suitable extruder directly into an enclosed mold cavity followed by said partial pre-vulcanization of the injected rubber composition therein.

In accordance with invention, various articles of manufacture may be prepared such as, for example, tires and industrial rubber products.

Exemplary of industrial rubber products are, for example, hoses and belts such as, for example, power transmission belts and conveyor belts.

In a further aspect of this invention, said is shaped, partially vulcanized, rubber composition is provided as a component for use in a tire which may, for example, be selected from at least one of a tire apex, sidewall insert for stiffening a tire sidewall and tire tread preferably a tire sidewall apex and, where the tire tread is composed of a cap/base construction, a tread cap or tread base.

Accordingly, in additional accordance with this invention, said tire sidewall apex is an apex designed to be positioned adjacent to a bead. portion of a pneumatic tire.

In further accordance with this invention, said tire sidewall insert is an insert to be positioned within the tire sidewall portion and spaced apart from the bead portion of a pneumatic tire in order to add stiffness to the sidewall itself.

In further accordance with this invention, an article of manufacture is provided by a process which comprises adhering at least one component as said partially sulfur pre-vulcanized, pre-shaped, rubber composition, to at least one additional component as an unvulcanized, sulfur vulcanizable, diene-based rubber composition, to form an assembly thereof and sulfur vulcanizing said assembly in a suitable mold at a temperature in a range of about 140° C. to about 190° C.

In additional accordance with this invention, said article of manufacture is a tire and said partially pre-vulcanized rubber composition is a component of said tire.

Accordingly, a tire is provided which is comprised of an assembly of at least one component as the partially pre-vulcanized rubber composition of this invention juxtapositioned to at least one additional, unvulcanized, diene-based, rubber composition; wherein said assembly is sulfur vulcanized in a suitable mold at a temperature in a range of about 140° C. to about 190° C.

It is considered herein that significant aspects of the invention for the preparation of the pre-partially vulcanized composite is (1) the use of silica and/or aluminosilicate for absorbing a portion various compounding ingredients such as, for example, various antidegradants and cure accelerators which may otherwise migrate to its surface and thereby inhibit, or reduce, its aforesaid interfacial adhesion, (2) utilization of relatively high concentrations of free sulfur as a curative in order to enhance the aforesaid interfacial adhesion by promoting interfacial sulfur-based crosslinking, and (3) use of a liquid polymer, preferably a conjugated diene-based liquid polymer, in order to reduce the processing viscosity of the rubber composition and, thereby, enhance both the mixing and dispersing of the rubber composition ingredients as well as the injection molding, where applicable, of the rubber composition into a suitable mold cavity for its partially pre-vulcanization step.

In particular, it is considered herein that it is more desirable to utilize such liquid polymer, particularly a conjugated diene-based liquid polymer, instead of a rubber processing oil and other typical rubber processing aids because processing oil and most other processing aids, particularly long chain fatty acids, are viewed as having a tendency to block cross-linking of the elastomers at the interfacial surfaces between respective rubber components due to diffusion of the oil and respective processing aid to the surface of the rubber composition.

It is to appreciated that, while the above individual aspects and/or ingredients are not necessarily by themselves new or novel, it is considered herein that a significant aspect of this invention is an innovative and novel creation of the combination of the multiplicity of ingredients and a manipulation thereof for the preparation of an article of manufacture where a component of dimensional stability with interfacial surface adhesion properties for adherence to unvulcanized rubber substrates is desired—particularly in the building of tires—and particularly for preparation of a tire sidewall apex and tire tread.

For a further understanding of the invention a drawing is provided herewith for further illustration and is not intended to be limitive insofar as the invention is concerned.

The drawing is a cut-away cross-sectional view of a portion of a pneumatic tire depicting a bead portion, tread portion and a connection sidewall portion.

A review of the drawing shows the tire cross-section (1) with a bead bundle (2), a sidewall portion (3), innerliner (4), carcass ply (5), a turn-up portion of the ply (5) ending at point (5A) or, alternatively, at point (5B), a tread (6), an apex (7) which is adjacent to the bead bundle (2).

The apex (7) is either encompassed by the carcass ply (5) in which its turn-up portion ends at point (5B) or is partially, and somewhat substantially, encompassed by the carcass ply (5) when its turn-up portion ends at point (5A).

The drawing also depicts a sidewall insert (8) which is positioned apart from the bead bundle (2) and inboard of carcass ply (5) and, thereby, encompassed by the carcass ply (5) and innerliner (4).

For the drawing, the apex (7) and sidewall insert (8) are intended to depict the rubber composition of this invention, namely the initially pre-formed, partially pre-cured rubber composition containing the liquid conjugated diene-based polymer, silica and coupling agent which is subsequently built as a component(s) of the tire and the resulting assembly then vulcanized.

In practice, the amorphous silica is preferably precipitated silica. Such silica is conventionally formed by precipitating a silicate with an acid as is well known by one having skill in such art.

In practice, the aluminosilicate is a product of co-precipitating a silicate and an aluminate and such aluminosilicates are, in general, well known to those having skill in such art.

The modified carbon black having silanol groups on the surface thereof may be prepared, for example, by treating the carbon black with an alkoxy or organoalkoxy silane at an elevated temperature such as, for example, a temperature in a range of about 100° C. to about 800° C., in an inert gaseous atmosphere (e.g. nitrogen atmosphere) for a period of about 10 to about 150 minutes or by co-fuming carbon black and silica at an elevated temperature (e.g. 600° C. to 800° C.)

For the practice of this invention, various diene-based elastomers may be used both for the pre-partially vulcanized rubber composition and the unvulcanized, diene-based, rubber composition to be juxtapositioned thereto.

Representative of various diene-based elastomers are, for example, homopolymers and copolymers if conjugated dienes such as, for example, isoprene and 1,3-butadiene as well as copolymers of conjugated dienes such as, for example, isoprene and 1,3-butadiene, with vinyl aromatic compounds such as styrene and alpha-methylstyrene, preferably styrene.

Preferably, the said conjugated diene is selected from at least one of isoprene and 1,3-butadiene.

Accordingly, representative of such elastomers are, for example, cis 1,4-polyisoprene (natural and synthetic), cis 1,4-polybutadiene, isoprene/butadiene, styrene/butadiene (both solution and emulsion polymerization prepared), high vinyl polybutadiene containing from about 35 to about 90 percent vinyl (1,2-) groups, styrene/isoprene/butadiene terpolymers, and trans 1,4-polybutadiene.

In practice, it is often preferred that such rubber composition also contains at least one coupling agent for said silica, aluminosilicate and said modified carbon black, as the case may be.

Representative of such coupling agents are, for example, bis-(trialkoxysilylalkyl) polysulfides containing in a range of about 2 to about 8 sulfur atoms in its polysulfidic bridge, with an average of from about 3.5 to about 4.5 sulfur atoms for a polysulfide material or an average of from about 2 to 2.6 sulfur atoms for a disulfide type of material.

Further representative of such material is bis-(3-triethoxysilylpropyl) polysulfide having an average of from 3.5 to 4.5, or an average of from 2 to 2.6, sulfur atoms in its polysulfidic bridge.

Conventionally a weight ratio of coupling agent to the total of said silica, aluminosilicate and. modified carbon black, as the case may be, might be in a range of about 0.01/1 to about 0.25/1.

The curatives for sulfur curing the rubber compositions used in this invention are curatives conventionally used for sulfur-curable elastomers which typically include sulfur, (e.g.: addition of free sulfur), and one or more appropriate cure accelerators and sometimes also a cure retarder. Such curatives and use thereof for sulfur-curable elastomer compositions are well known to those skilled in the art.

Sequential mixing processes for preparing sulfur-curable rubber compositions in which elastomers and associated ingredients exclusive of curatives are first mixed in one or more sequential steps, usually called a "non-productive mixing step(s)" followed by a final mixing step for adding curatives, usually called a "productive mixing step", are also well known to those skilled in the art.

The commonly-employed siliceous pigments used in rubber compounding applications can be used as the silica in this invention, including pyrogenic and precipitated siliceous pigments, including aluminosilicates, although precipitated silicas and aluminosilicates are usually preferred.

The siliceous pigments preferably employed in this invention are precipitated silicas such as, for example, those obtained by the acidification of a soluble silicate, e.g., sodium silicate, generally exclusive of silica gels.

Such silicas might be characterized, for example, by having a BET surface area, as measured using nitrogen gas, preferably in the range of about 40 to about 600, and more usually in a range of about 50 to about 300 square meters per gram (m²/g). The BET method of measuring surface area is described in the *Journal of the American Chemical Society*, volume 60, page 304 (1938).

The silica may also be typically characterized by having a dibutylphthalate (DBP) absorption value in a range of about 100 to about 400, and more usually about 150 to about 300 cc/100 gm.

Various commercially available precipitated silicas may be considered for use in this invention such as, only for example herein, and without limitation, silicas commercially available from PPG Industries under the Hi-Sil trademark with designations 210, 243, etc; silicas available from Rhodia, with, for example, designations of Zeosil 1165MP and silicas available from Degussa AG with, for example, designations VN2 and VN3, etc. and from Huber as Zeopol 8745.

It is readily understood by those having skill in the art that the rubber composition would be compounded by methods generally known in the rubber compounding art, such as mixing the various sulfur-vulcanizable constituent rubbers with various commonly-used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur-vulcanizable and sulfur-vulcanized material (rubbers), the additives mentioned above are selected and commonly used in conventional amounts.

Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others such as, for example, those disclosed in *The Vanderbilt Rubber Handbook* (1978), pages 344–346. Typical amounts of antiozonants comprise about 1 to 5 phr.

Typical amounts of fatty acids, if used, which can include stearic acid, palmitic acid, linolenic acid or mixtures of one or more fatty acids, can comprise about 0.5 to about 3 phr.

Often stearic acid is used in a relatively impure state and is commonly referred to in the rubber compounding practice as "stearic acid" and is so referred to in the description and practice of this invention.

Typical amounts of zinc oxide may comprise about 2 to about 10 phr. Typical amounts of waxes comprise about 1 to about 5 phr. Often microcrystalline waxes are used. Typical amounts of peptizers, if used, may comprise about 0.05 to about 1 phr. Typical peptizers may be, for example, pentachlorothiophenol and dibenzamidodiphenyl disulfide.

The vulcanization is conducted in the presence of a sulfur-vulcanizing agent. Examples of suitable sulfur-vulcanizing agents include elemental sulfur (free sulfur) or sulfur-donating vulcanizing agents, for example, an amine disulfide, polymeric polysulfide or sulfur olefin adducts. Preferably, the sulfur-vulcanizing agent is elemental sulfur. A relatively high level of elemental sulfur-vulcanizing agent is preferably used in an amount ranging from about 3 to about 8 phr may be preferred in order that the partially pre-vulcanized rubber composition possesses a relatively high level of unused free sulfur at or on its surface which is available to participate in crosslinking of rubber based components at their interfaces.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2, phr. In another embodiment, combinations of a primary and a secondary accelerator might be used with the secondary accelerator being used in amounts of about 0.05 to about 3 phr in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of various additives, as hereinbefore described, are not considered to be an aspect of the present invention, unless otherwise designated herein, which is more primarily directed to the preparation of products by providing a pre-shaped, partially cured, rubber composition and use thereof as a component of a manufactured article.

The ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage (s). The rubber, hollow particles, silica, carbon black, modified carbon black, and coupling agent, as the case may, are mixed in one or more non-productive mix stages. The terms "non-productive" and "productive" mix stages are well known to those having skill in the rubber mixing art.

In at least one of the non-productive (NP) mixing stages, the materials are thermomechanically mixed and the mixing temperature is allowed to reach a temperature between 140° C. and 190° C.

As hereinbefore discussed, the product of this invention can be used for various purposes. For example, it can be used for various tire components such as, for example, a tire sidewall insert such as an apex associated with the bead region of the tire, a tire sidewall insert spaced apart from the tire's bead region and a tire tread where a pre-partially vulcanized tread is applied to a green, unvulcanized tire carcass.

The following example is provided to further illustrate the invention. The parts and percentages are by weight unless otherwise indicated.

EXAMPLE I

A pre-shaped, partially sulfur pre-vulcanized rubber composition is prepared by inserting a rectangular sample of a sulfur vulcanizable rubber composition in a suitable mold cavity, closing the mold and partially sulfur vulcanizing the sample under pressure at a temperature of about 150° C. for about 8–10 minutes, to about thirty percent of its $T_{90}$ state of cure.

Alternatively, a pre-shaped, partially sulfur pre-vulcanized rubber composition is prepared by injection molding a sample of a sulfur-vulcanizable rubber composition by extrusion into in an enclosed suitable mold cavity and partially sulfur vulcanizing the sample under pressure at a temperature of about 150° C. within about 2 to about 10 minutes, to about thirty percent of its $T_{90}$ state of cure.

A tire is then prepared by juxtapositioning the partially vulcanized rubber composition as an apex component of a tire to at least one unvulcanized, diene-based, rubber composition as a component in an assembly of rubber based components from an assembly thereof.

The tire assembly is then sulfur vulcanized in a suitable mold at an elevated pressure at a temperature of about 140° C. to about 150° C. for about 40 to about 60 minutes.

The compositions of both the said pre-partially vulcanized rubber compositions are shown in the following Table as Samples C and D wherein Samples A and B are provided as a Controls.

TABLE 1

| | Sample A Contrl | Sample B Contrl | Sample C | Sample D |
|---|---|---|---|---|
| First Non-Productive Mix Stage | | | | |
| Natural cis 1,4-polyisoprene rubber | 100 | 100 | 100 | 100 |
| Carbon black A[1] | 40 | 0 | 0 | 0 |
| Carbon black B[2] | 0 | 40 | 0 | 0 |
| Amorphous silica[3] | 0 | 0 | 30 | 30 |
| Coupling agent[4] | 0 | 0 | 4.5 | 3 |
| Fatty acid[5] | 0.75 | 0.75 | 0.75 | 0.75 |
| Liquid cis 1,4-polyisoprene polymer[6] | 4.5 | 4.5 | 4.5 | 3 |
| Second Non-Productive Mix Stage | | | | |
| Carbon black A | 30 | 0 | 0 | 0 |
| Carbon black B | 0 | 20 | 0 | 0 |
| Amorphous silica | 0 | 0 | 25 | 15 |
| Coupling agent | 0 | 0 | 3.5 | 1 |
| Productive Mix Stage | | | | |
| Zinc oxide | 9 | 9 | 9 | 10 |
| Sulfur | 6 | 6 | 6 | 3.7 |
| Accelerators[7] | 1.5 | 1.5 | 1.5 | 1.7 |
| Antidegradants[8] | 2.5 | 2.5 | 2.5 | 2.5 |

[1]N330, an ASTM designation.
[2]N234, an ASTM designation.
[3]Precipitated silica as Zeosil 1165MP, a trademark of the Rhodia company.
[4]A composite of a 50/50 ratio of bis-(3-ethoxysilylpropyl) disulfide on a carbon black substrate as Si266, a trademark of Degussa AG.
[5]Primarily stearic acid.
[6]Liquid cis 1,4-polyisoprene polymer as LIR50 a trademark of the Kuraray company having a molecular weight of about 4000.
[7]Of the sulfenamide type.
[8]Amine type antidegradants.

TABLE 2

| Properties | Sample A Contrl | Sample B Contrl | Sample C | Sample C |
|---|---|---|---|---|
| Physical Properties | | | | |
| Unvulcanized Rubber Composition Mooney (ML4) viscosity | 63 | 44 | 37 | 41.7 |
| Rheometer (150° C.) | | | | |
| $T_{25}$, minutes | 4.9 | 5.8 | 5.1 | 5.5 |
| $T_{90}$, minutes | 12.8 | 12.6 | 15.1 | 13.6 |
| Vulcanized Rubber Composition Properties Stress-Strain | | | | |
| Tensile Strength, MPa | 21.2 | 21.3 | 21.3 | 23.3 |
| Elongation @ Break, % | 315 | 308 | 514 | 635 |
| 100% Modulus, MPa | 5.6 | 6.4 | 3 | 1.8 |
| 300% Modulus, MPa | 20.5 | 20.3 | 11.8 | 7.7 |
| Rebound | | | | |
| 23° C., percent | 50.5 | 48 | 52 | 58.2 |
| 100° C., percent | 70.4 | 69.8 | 67 | 71.4 |
| Hardness (Shore A) | | | | |
| Shore A | 76 | 79 | 73.4 | 62 |
| Adhesion (Newtons?) | | | | |
| To itself (N/mm) | 6 | 4 | 59 | 64 |
| To itself with one side being pre-vulcanized for 10 mins. at 150° C. (N/mm) | 0 | 0 | 35 | 43 |

From Table 2 it can readily be seen that the use of silica-reinforced rubber composition in combination with the use of a coupling agent plus the liquid polyisoprene polymer results in a substantial increase in interfacial vulcanized adhesion between vulcanized assembly of the partially pre-vulcanized rubber composition and the unvulcanized rubber composition.

This is considered herein to be beneficial because adequate interfacial adhesion of rubber components is essential for good performance of the tire in the field.

The utilization of a silica coupler for the silica is understood herein to contribute to a good incorporation and dispersion of the silica.

In particular, the utilization of the liquid polyisoprene polymer is understood herein to contribute to final interfacial vulcanized adhesion because the-liquid polymer will vulcanize to a lesser extent, as compared to the diene-based elastomers of the rubber compositions, since it typically has a slower rate of vulcanization and can migrate to the rubber composition's interface after the partial pre-vulcanization step and, therefore, enhance the interfacial cross-linking between available-free sulfur and the somewhat less vulcanized liquid polymer itself as well as the remainder if the interfacial rubber surfaces.

In particular, the relatively high sulfur content, as hereinbefore discussed, is seen herein to allow for an excess of free sulfur remaining after the partial pre-vulcanization which is then available to aid in promoting interfacial elastomer crosslinking.

Indeed, inspection of Table 2 readily shows that the interfacial adhesion after partial pre-curing property(ies) of Sample(s) C and D were substantially superior as compared to Control Samples A and B. This is an indication of the enhanced adhesion potential of the partially pre-cured rubber compositions of this invention.

While certain representative embodiments and details have been shown for the purpose of illustrating the invention, it will be apparent to those skilled in this art that various changes and modifications may be made therein without departing from the spirit or scope of the invention.

What is claimed is:

1. A partially sulfur pre-vulcanized rubber composition comprised of, based on 100 parts by weight of elastomer, (A) at least one solid diene-based elastomer selected from homopolymers and copolymers of conjugated diene and copolymers of at least one conjugated diene with a vinyl aromatic compound selected from styrene and alpha-methylstyrene, (B) about 3 to about 15 phr of liquid conjugated diene polymer having a molecular weight in a range of about 1,000 to about 40,000, (C) from about 45 to about 65 phr of reinforcing filler selected from amorphous silica, amorphous aluminosilicate, and modified carbon black; wherein said amorphous silica, aluminosilicate and modified carbon black have silanol groups on the surface thereof, wherein said modified carbon black is prepared by treating carbon black with an alkoxy or organoalkoxy silane or by co-fuming carbon black and silica, and, wherein said reinforcing filler contains from about 60 to about 100 weight percent of at least one of said amorphous silica and aluminosilicate and (D) a coupling agent having a moiety reactive with said silanol groups on the surface of the said amorphous silica, aluminosilicate and modified carbon black and another moiety interactive with at least one of said diene-based elastomers; wherein said rubber composition is pre-sulfur vulcanized to about 20 to about 60 percent of its $T_{90}$ vulcanization state.

2. The composition of claim 1 wherein said composition is pre-shaped and partially pre-vulcanized by positioning said rubber composition in a suitable enclosed mold cavity and heating the rubber composition to a temperature in a range of about 140° C. to about 190° C. for a sufficient period of time for the rubber composition to vulcanize to about 20 to about 60 percent of its $T_{90}$ vulcanization state according to ASTM D5289.

3. The composition of claim 1 wherein said liquid conjugated diene-based polymers is selected from at least one of liquid cis 1,4-polyisoprene polymer, liquid cis 1,4-polybutadiene polymer and liquid styrene/butadiene copolymer polymer.

4. The composition of claim 2 wherein said liquid conjugated diene-based polymers is selected from at least one of liquid cis 1,4-polyisoprene polymer, liquid cis 1,4-polybutadiene polymer and liquid styrene/butadiene copolymer polymer.

5. The composition of claim 1 wherein said liquid conjugated diene-based polymer is end functionalized by an hydroxyl, mercapto or epoxy moiety.

6. The composition of claim 2 wherein said liquid conjugated diene-based polymer is end functionalized by an hydroxyl, mercapto or epoxy moiety.

7. The composition of claim 3 wherein said liquid conjugated diene-based polymer is end functionalized by an hydroxy, mercapto or epoxy moiety.

8. The composition of claim 4 wherein said liquid conjugated diene-based polymer is end functionalized by an hydroxy, mercapto or epoxy moiety.

9. The composition of claim 2 wherein said liquid conjugated diene-based polymer is end functionalized by an hydroxy moiety.

10. The composition of claim 1 wherein said liquid conjugated diene-based polymer is a cis 1,4-polyisoprene polymer.

11. The composition of claim 2 wherein said liquid conjugated diene-based polymer is a cis 1,4-polyisoprene polymer.

12. The composition of claim 3 wherein said liquid conjugated diene-based polymer is a cis 1,4-polyisoprene polymer.

13. The composition of claim 5 wherein said liquid conjugated diene-based polymer is a cis 1,4-polyisoprene polymer.

14. The composition of claim 6 wherein said liquid conjugated diene-based polymer is a cis 1,4-polyisoprene polymer.

15. The composition of claim 7 wherein said liquid conjugated diene-based polymer is a cis 1,4-polyisoprene polymer.

16. The composition of claim 1 wherein said liquid conjugated diene-based polymer is a depolymerized cis 1,4-polyisoprene natural rubber.

17. The composition of claim 2 wherein said liquid conjugated diene-based polymer is a depolymerized cis 1,4-polyisoprene natural rubber.

18. The composition of claim 3 wherein said liquid conjugated diene-based polymer is a depolymerized cis 1,4-polyisoprene natural rubber.

19. The composition of claim 5 wherein said liquid conjugated diene-based polymer is a depolymerized cis 1,4-polyisoprene natural rubber.

20. The composition of claim 6 wherein said liquid conjugated diene-based polymer is a depolymerized cis 1,4-polyisoprene natural rubber.

21. The partially vulcanized composition of claim 1 wherein, prior to its partial pre-vulcanization, contains free sulfur curative in a range of about 2 to about 8 phr.

22. The partially vulcanized composition of claim 2 wherein, prior to its partial pre-vulcanization, contains free sulfur curative in a range of about 3 to about 8 phr.

23. The composition of claim 5 wherein said liquid conjugated diene-based polymer is a depolymerized cis 1,4-polyisoprene natural rubber.

24. The composition of claim 6 wherein said liquid conjugated diene-based polymer is a depolymerized cis 1,4-polyisoprene natural rubber.

25. The composition of claim 11 wherein said liquid conjugated diene-based polymer is a depolymerized cis 1,4-polyisoprene natural rubber.

26. The composition of claim 17 wherein said liquid conjugated diene-based polymer is a depolymerized cis 1,4-polyisoprene natural rubber.

27. The composition of claim 1 wherein said reinforcing filler is carbon black.

28. The composition of claim 2 wherein said reinforcing filler is carbon black.

29. The composition of claim 6 wherein said reinforcing filler is carbon black.

30. The composition of claim 11 wherein said reinforcing filler is carbon black.

31. The composition of claim 1 wherein said reinforcing filler is carbon black and at least one of amorphous silica, aluminosilicate and modified carbon black; wherein said aluminosilicate is the product of co-precipitating a silicate and an aluminate and said modified carbon black is a carbon black modified by treatment with an alkoxysilane or by co-fuming carbon black and silica.

32. The composition of claim 2 wherein said reinforcing filler is carbon black and at least one of amorphous silica, aluminosilicate and modified carbon black; wherein said aluminosilicate is the product of co-precipitating a silicate and an aluminate and said modified carbon black is a carbon black modified by treatment with an alkoxysilane or by co-fuming carbon black and silica.

33. The pre-shaped, partially vulcanized composition of claim 1 prepared by injection molding the unvulcanized rubber composition into an enclosed mold cavity followed by said partial pre-vulcanizing the injected rubber composition therein.

34. The pre-shaped, partially vulcanized composition of claim 2 prepared by injection molding the unvulcanized rubber composition into an enclosed mold cavity followed by said partial pre-vulcanizing the injected rubber composition therein.

35. The pre-shaped, partially vulcanized composition of claim 5 prepared by injection molding the unvulcanized rubber composition into an enclosed mold cavity followed by said partial pre-vulcanizing the injected rubber composition therein.

36. The pre-shaped, partially vulcanized composition of claim 6 prepared by injection molding the unvulcanized rubber composition into an enclosed mold cavity followed by said partial pre-vulcanizing the injected rubber composition therein.

37. The pre-shaped, partially vulcanized composition of claim 11 prepared by injection molding the unvulcanized rubber composition into an enclosed mold cavity followed by said partial pre-vulcanizing the injected rubber composition therein.

38. The pre-shaped, partially vulcanized composition of claim 17 prepared by extruding the unvulcanized rubber composition by a suitable extruder directly into an enclosed mold cavity followed by said partial pre-vulcanization of the injected rubber composition therein.

39. An article of manufacture having at least one component comprised of the pre-shaped, partially pre-vulcanized composition of claim 1.

40. An article of manufacture having at least one component comprised of the pre-shaped, partially pre-vulcanized composition of claim 2.

41. An article of manufacture having at least one component comprised of the pre-shaped, partially pre-vulcanized composition of claim 5.

42. An article of manufacture having at least one component comprised of the pre-shaped, partially pre-vulcanized composition of claim 6.

43. An article of manufacture having at least one component comprised of the pre-shaped, partially pre-vulcanized composition of claim 11.

44. An article of manufacture having at least one component comprised of the pre-shaped, partially pre-vulcanized composition of claim 17.

45. An article of manufacture having at least one component comprised of the pre-shaped, partially pre-vulcanized composition of claim 22.

46. An article of manufacture having at least one component comprised of the pre-shaped, partially pre-vulcanized composition of claim 34.

47. An article of manufacture having at least one component comprised of the pre-shaped, partially pre-vulcanized composition of claim 35.

48. An article of manufacture having at least one component comprised of the pre-shaped, partially pre-vulcanized composition of claim 36.

49. A tire having at least one component comprised of the pre-shaped, partially pre-vulcanized composition of claim 1.

50. A tire having at least one component comprised of the pre-shaped, partially pre-vulcanized composition of claim 2.

51. A tire having at least one component comprised of the pre-shaped, partially pre-vulcanized composition of claim 5.

52. A tire having at least one component comprised of the pre-shaped, partially pre-vulcanized composition of claim 6.

53. A tire having at least one component comprised of the pre-shaped, partially pre-vulcanized composition of claim 11.

54. A tire having at least one component comprised of the pre-shaped, partially pre-vulcanized composition of claim 17.

55. A tire having at least one component comprised of the pre-shaped, partially pre-vulcanized composition of claim 22.

56. A tire having at least one component comprised of the pre-shaped, partially pre-vulcanized composition of claim 34.

57. A tire having at least one component comprised of the pre-shaped, partially pre-vulcanized composition of claim 35.

58. A pneumatic tire having a tread comprised of the composition of claim 1.

59. A pneumatic tire having a tread comprised of the composition of claim 2.

60. A pneumatic tire having a tread comprised of the composition of claim 5.

61. A pneumatic tire having a tread comprised of the composition of claim 6.

62. A pneumatic tire having a tread comprised of the composition of claim 11.

63. A pneumatic tire having a tread comprised of the composition of claim 17.

64. A pneumatic tire having a tread comprised of the composition of claim 34.

65. A pneumatic tire having an apex positioned adjacent to the tire's bead portion wherein said apex is comprised of the composition of claim 1.

66. A pneumatic tire having an apex positioned adjacent to the tire's bead portion wherein said apex is comprised of the composition of claim 2.

67. A pneumatic tire having an apex positioned adjacent to the tire's bead portion wherein said apex is comprised of the composition of claim 5.

68. A pneumatic tire having an apex positioned adjacent to the tire's bead portion wherein said apex is comprised of the composition of claim 6.

69. A pneumatic tire having an apex positioned adjacent to the tire's bead portion wherein said apex is comprised of the composition of claim 11.

70. A pneumatic tire having an apex positioned adjacent to the tire's bead portion wherein said apex is comprised of the composition of claim 17.

71. A pneumatic tire having a sidewall insert positioned within a tire sidewall and spaced apart from the tire's bead portion wherein said insert is comprised of the composition of claim 1.

72. A pneumatic tire having a sidewall insert positioned within a tire sidewall and spaced apart from the tire's bead portion wherein said insert is comprised of the composition of claim 2.

73. A pneumatic tire having a sidewall insert positioned within a tire sidewall and spaced apart from the tire's bead portion wherein said insert is comprised of the composition of claim 5.

74. A pneumatic tire having a sidewall insert positioned within a tire sidewall and spaced apart from the tire's bead portion wherein said insert is comprised of the composition of claim 6.

75. A pneumatic tire having a sidewall insert positioned within a tire sidewall and spaced apart from the tire's bead portion wherein said insert is comprised of the composition of claim 11.

76. A pneumatic tire having a sidewall insert positioned within a tire sidewall and spaced apart from the tire's bead portion wherein said insert is comprised of the composition of claim 17.

77. A method of preparing an article of manufacture by adhering at least one component as said partially sulfur pre-vulcanized, pre-shaped, rubber composition of claim 1 to at least one additional component as an unvulcanized, sulfur vulcanizable, diene-based rubber composition, to form an assembly thereof and sulfur vulcanizing said assembly in a suitable mold at a temperature in a range of about 140° C. to about 190° C.

78. A method of preparing an article of manufacture by adhering at least one component as said partially sulfur pre-vulcanized, pre-shaped, rubber composition of claim 2 to at least one additional component as an unvulcanized, sulfur vulcanizable, diene-based rubber composition, to form an assembly thereof and sulfur vulcanizing said assembly in a suitable mold at a temperature in a range of about 140° C. to about 190° C.

79. A method of preparing an article of manufacture by adhering at least one component as said partially sulfur pre-vulcanized, pre-shaped, rubber composition of claim 5 to at least one additional component as an unvulcanized, sulfur vulcanizable, diene-based rubber composition, to form an assembly thereof and sulfur vulcanizing said assembly in a suitable mold at a temperature in a range of about 140° C. to about 190° C.

80. A method of preparing an article of manufacture by adhering at least one component as said partially sulfur pre-vulcanized, pre-shaped, rubber composition of claim 6 to at least one additional component as an unvulcanized, sulfur vulcanizable, diene-based rubber composition, to form an assembly thereof and sulfur vulcanizing said assembly in a suitable mold at a temperature in a range of about 140° C. to about 190° C.

81. A method of preparing an article of manufacture by adhering at least one component as said partially sulfur pre-vulcanized, pre-shaped, rubber composition of claim 11 to at least one additional component as an unvulcanized, sulfur vulcanizable, diene-based rubber composition, to form an assembly thereof and sulfur vulcanizing said assembly in a suitable mold at a temperature in a range of about 140° C. to about 190° C.

82. A method of preparing an article of manufacture by adhering at least one component as said partially sulfur pre-vulcanized, pre-shaped, rubber composition of claim 17 to at least one additional component as an unvulcanized, sulfur vulcanizable, diene-based rubber composition, to form an assembly thereof and sulfur vulcanizing said assembly in a suitable mold at a temperature in a range of about 140° C. to about 190° C.

83. A method of preparing an article of manufacture by adhering at least one component as said partially sulfur pre-vulcanized, pre-shaped, rubber composition of claim 34 to at least one additional component as an unvulcanized, sulfur vulcanizable, diene-based rubber composition, to form an assembly thereof and sulfur vulcanizing said assembly in a suitable mold at a temperature in a range of about 140° C. to about 190° C.

84. A method of preparing an article of manufacture by adhering at least one component as said partially sulfur pre-vulcanized, pre-shaped, rubber composition of claim 35 to at least one additional component as an unvulcanized, sulfur vulcanizable, diene-based rubber composition, to form an assembly thereof and sulfur vulcanizing said assembly in a suitable mold at a temperature in a range of about 140° C. to about 190° C.

85. An article of manufacture prepared by the method of claim 77.

86. An article of manufacture prepared by the method of claim 78.

87. An article of manufacture prepared by the method of claim 79.

88. An article of manufacture prepared by the method of claim 80.

89. An article of manufacture prepared by the method of claim 81.

90. An article of manufacture prepared by the method of claim 82.

91. An article of manufacture prepared by the method of claim 83.

92. An article of manufacture prepared by the method of claim 84.

93. The article of manufacture of claim 85 wherein said article is a tire and said partially pre-vulcanized rubber composition is a component of said tire.

94. The article of manufacture of claim 86 wherein said article is a tire and said partially pre-vulcanized rubber composition is a component of said tire.

95. The article of manufacture of claim 87 wherein said article is a tire and said partially pre-vulcanized rubber composition is a component of said tire.

96. The article of manufacture of claim 88 wherein said article is a tire and said partially pre-vulcanized rubber composition is a component of said tire.

97. The article of manufacture of claim 89 wherein said article is a tire and said partially pre-vulcanized rubber composition is a component of said tire.

98. The article of manufacture of claim 90 wherein said article is a tire and said partially pre-vulcanized rubber composition is a component of said tire.

99. The article of manufacture of claim 91 wherein said article is a tire and said partially pre-vulcanized rubber composition is a component of said tire.

100. The article of manufacture of claim 92 wherein said article is a tire and said partially pre-vulcanized rubber composition is a component of said tire.

101. The article of manufacture of claim 85 where said tire component is a tread.

102. The article of manufacture of claim 86 where said tire component is a tread.

103. The article of manufacture of claim 87 where said tire component is a tread.

104. The article of manufacture of claim 88 where said tire component is a tread.

105. The article of manufacture of claim 89 where said tire component is a tread.

106. The article of manufacture of claim 90 where said tire component is a tread.

107. The article of manufacture of claim 91 where said tire component is a tread.

108. The article of manufacture of claim 92 where said tire component is a tread.

109. The article of manufacture of claim 85 wherein said tire component is an apex positioned within a tire sidewall adjacent to a tire bead portion.

110. The article of manufacture of claim 85 wherein said tire component is a sidewall insert positioned with a tire sidewall and spaced apart from a tire bead portion.

111. The article of manufacture of claim 86 wherein said tire component is selected from at least one of an apex positioned within a tire sidewall adjacent to a tire bead portion and a sidewall insert positioned with a tire sidewall and spaced apart from a tire bead portion.

112. The article of manufacture of claim 111 wherein said tire component is an apex.

113. The article of manufacture of claim 87 wherein said tire component is selected from at least one of an apex positioned within a tire sidewall adjacent to a tire bead portion and a sidewall insert positioned with a tire sidewall and spaced apart from a tire bead portion.

114. The article of manufacture of claim 88 wherein said tire component is selected from at least one of an apex positioned within a tire sidewall adjacent to a tire bead portion and a sidewall insert positioned with a tire sidewall and spaced apart from a tire bead portion.

115. The article of manufacture of claim 89 wherein said tire component is selected from at least one of an apex positioned within a tire sidewall adjacent to a tire bead portion and a sidewall insert positioned with a tire sidewall and spaced apart from a tire bead portion.

116. The article of manufacture of claim 90 wherein said tire component is selected from at least one of an apex positioned within a tire sidewall adjacent to a tire bead portion and a sidewall insert positioned with a tire sidewall and spaced apart from a tire bead-portion.

117. The article of manufacture of claim 91 wherein said tire component is selected from at least one of an apex positioned within a tire sidewall adjacent to a tire bead portion and a sidewall insert positioned with a tire sidewall and spaced apart from a tire bead portion.

118. The article of manufacture of claim 92 wherein said tire component is selected from at least one of an apex positioned within a tire sidewall adjacent to a tire bead portion and a sidewall insert positioned with a tire sidewall and spaced apart from a tire bead portion.

119. The article of manufacture of claim 85 wherein said coupling agent for said partially vulcanized rubber composition is a bis-(3-trialkoxysilylalkyl) polysulfide containing an average of from 2.2 to about 4 sulfur atoms in its polysulfidic bridge.

120. The article of manufacture of claim 86 wherein said coupling agent for said partially vulcanized rubber composition is a bis-(3-trialkoxysilylalkyl) polysulfide containing an average of from 2.2 to about 4 sulfur atoms in its polysulfidic bridge.

121. The article of manufacture of claim 87 wherein said coupling agent for said partially vulcanized rubber composition is a bis-(3-trialkoxysilylalkyl) polysulfide containing an average of from 2.2 to about 4 sulfur atoms in its polysulfidic bridge.

122. The article of manufacture of claim 88 wherein said coupling agent for said partially vulcanized rubber composition is a bis-(3-trialkoxysilylalkyl) polysulfide containing an average of from 2.2 to about 4 sulfur atoms in its polysulfidic bridge.

123. The article of manufacture of claim 89 wherein said coupling agent for said partially vulcanized rubber composition is a bis-(3-trialkoxysilylalkyl) polysulfide containing an average of from 2.2 to about 4 sulfur atoms in its polysulfidic bridge.

124. The article of manufacture of claim 90 wherein said coupling agent for said partially vulcanized rubber composition is a bis-(3-trialkoxysilylalkyl) polysulfide containing an average of from 2.2 to about 4 sulfur atoms in its polysulfidic bridge.

125. The article of manufacture of claim 91 wherein said coupling agent for said partially vulcanized rubber composition is a bis-(3-trialkoxysilylalkyl) polysulfide containing an average of from 2.2 to about 4 sulfur atoms in its polysulfidic bridge.

126. The article of manufacture of claim 92 wherein said coupling agent for said partially vulcanized rubber composition is a bis-(3-trialkoxysilylalkyl) polysulfide containing an average of from 2.2 to about 4 sulfur atoms in its polysulfidic bridge.

127. The article of manufacture of claim 93 wherein said coupling agent for said partially vulcanized rubber composition is a bis-(3-trialkoxysilylalkyl) polysulfide containing an average of from 2.2 to about 4 sulfur atoms in its polysulfidic bridge.

128. The article of manufacture of claim 94 wherein said coupling agent for said partially vulcanized rubber composition is a bis-(3-trialkoxysilylalkyl) polysulfide containing an average of from 2.2 to about 4 sulfur atoms in its polysulfidic bridge.

129. The article of manufacture of claim 95 wherein said coupling agent for said partially vulcanized rubber composition is a bis-(3-trialkoxysilylalkyl) polysulfide containing an average of from 2.2 to about 4 sulfur atoms in its polysulfidic bridge.

130. The article of manufacture of claim 96 wherein said coupling agent for said partially vulcanized rubber composition is a bis-(3-trialkoxysilylalkyl) polysulfide containing an average of from 2.2 to about 4 sulfur atoms in its polysulfidic bridge.

131. The article of manufacture of claim 97 wherein said coupling agent for said partially vulcanized rubber composition is a bis-(3-trialkoxysilylalkyl) polysulfide containing an average of from 2.2 to about 4 sulfur atoms in its polysulfidic bridge.

\* \* \* \* \*